United States Patent
Kang et al.

(10) Patent No.: US 11,860,332 B1
(45) Date of Patent: Jan. 2, 2024

(54) SEMI-AIRBORNE ELECTROMAGNETIC SURVEY DEVICE AND METHOD BASED ON COAXIAL COPLANAR MUTUAL REFERENCE COIL ASSEMBLY

(71) Applicant: Institute of Geology and Geophysics, Chinese Academy of Sciences, Beijing (CN)

(72) Inventors: Lili Kang, Beijing (CN); Zhongxing Wang, Beijing (CN); Xiong Yin, Beijing (CN); Zhiyao Liu, Beijing (CN)

(73) Assignee: INSTITUTE OF GEOLOGY AND GEOPHYSICS, CHINESE ACADEMY OF SCIENCES

( * ) Notice: Subject to any disclaimer, the term of this patent is extended or adjusted under 35 U.S.C. 154(b) by 0 days.

(21) Appl. No.: 18/355,666

(22) Filed: Jul. 20, 2023

(30) Foreign Application Priority Data

Aug. 12, 2022 (CN) .......................... 202210967640.4

(51) Int. Cl.
  *G01V 3/16* (2006.01)
  *G01V 3/36* (2006.01)
  (Continued)

(52) U.S. Cl.
  CPC ................ *G01V 3/165* (2013.01); *G01V 3/36* (2013.01); *G01V 3/38* (2013.01)

(58) Field of Classification Search
  CPC ............. G01V 3/165; G01V 3/36; G01V 3/38
  See application file for complete search history.

(56) References Cited

U.S. PATENT DOCUMENTS 5,610,523 A * 3/1997 Elliot ....................... G01V 3/17
  324/330
2010/0052685 A1* 3/2010 Kuzmin ................. G01V 3/165
  324/331
(Continued)

FOREIGN PATENT DOCUMENTS

AU        2020101956 A4    10/2020
CN       104865608 A  *  8/2015  ............... G01V 3/10
(Continued)

OTHER PUBLICATIONS

Kang et al_CN-115356774-A_2022_English Translation (2022).*
(Continued)

*Primary Examiner* — Jermele M Hollington
*Assistant Examiner* — Suresh K Rajaputra
(74) *Attorney, Agent, or Firm* — Rachel Pilloff; Sean Passino; Martin Cosenza

(57) ABSTRACT

A semi-airborne electromagnetic survey device and a semi-airborne electromagnetic survey method based on coaxial coplanar mutual reference coil assembly are provided. The device includes a measuring coil and a reference coil with linear correlation of additive motion noise; the reference coil and the measuring coil have a same bandwidth, are coaxial and coplanar and are in hard connection or soft connection; detection resolution of the reference coil only distinguishes the additive motion noise; detection resolution of the measuring coil distinguishes real vertical magnetic field signals and motion noise simultaneously; the reference coil has a much smaller outer diameter than the measuring coil. In the method, one coil only receives the additive motion noise, and an other coil simultaneously receives the additive motion noise and the real vertical magnetic field signals; and the additive motion noise received by the two coils is cancelled to obtain the real vertical magnetic field signals.

8 Claims, 6 Drawing Sheets

(51) Int. Cl.
*G01V 3/38* (2006.01)
*G01V 3/165* (2006.01)

(56) References Cited

U.S. PATENT DOCUMENTS

| | | | | |
|---|---|---|---|---|
| 2010/0244843 A1* | 9/2010 | Kuzmin | ................. | G01V 3/165 |
| | | | | 324/345 |
| 2011/0181290 A1* | 7/2011 | Kuzmin | .................... | G01V 3/17 |
| | | | | 324/331 |
| 2014/0285206 A1* | 9/2014 | West | ........................ | G01V 3/28 |
| | | | | 324/333 |
| 2016/0231449 A1* | 8/2016 | Miles | ....................... | G01V 3/16 |

FOREIGN PATENT DOCUMENTS

| | | | | |
|---|---|---|---|---|
| CN | 108535667 A | | 9/2018 | |
| CN | 110361785 A | | 10/2019 | |
| CN | 111650653 A | | 9/2020 | |
| CN | 112666613 A | | 4/2021 | |
| CN | 113791451 A | | 12/2021 | |
| CN | 115356774 A | * | 11/2022 | ............... G01V 3/36 |

OTHER PUBLICATIONS

Chen etal_CN-104865608-A_2015_English Translation (2015).*
Notice of Registration for China Application No. 202210967640.4, dated Apr. 21, 2023.
Song Gao et al., "Development of test device for semi-airborne transient electromagnetic receiver," Progress in Geophysics, Jun. 2017, pp. 1,339-1,345, vol. 32, No. 3.

* cited by examiner

SEMI-AIRBORNE ELECTROMAGNETIC SURVEY DEVICE AND METHOD BASED ON COAXIAL COPLANAR MUTUAL REFERENCE COIL ASSEMBLY

CROSS-REFERENCE TO RELATED APPLICATIONS

This application claims priority of Chinese Patent Application No. 202210967640.4, filed on Aug. 12, 2022, the entire contents of which are incorporated herein by reference.

TECHNICAL FIELD

The application belongs to the technical field of electromagnetic measurement, and in particular to a semi-airborne electromagnetic survey device and a semi-airborne electromagnetic survey method based on uniaxial measurement and a coaxial coplanar mutual reference coil assembly.

BACKGROUND

The artificial source electromagnetic method is one of the geophysical methods to realize great deep detection. According to different construction spaces, the artificial source electromagnetic method is divided into a ground electromagnetic survey method, an airborne electromagnetic survey method and a semi-airborne electromagnetic survey method. Among them, the semi-airborne electromagnetic survey method uses the emitter laid on the ground to excite the underground anomalous body, and uses receiving system carried by the flight platforms such as helicopters and airships to measure the response magnetic field in the air. Compared with an airborne electromagnetic survey system, the ground-based emission source is not limited by volume and weight, and may increase the intensity of the response signals through high-power emission, thus obtaining a greater detection depth. Compared with the ground electromagnetic survey system, the airborne electromagnetic survey system has stronger adaptability to complex terrain and may realize rapid detection. Therefore, due to the advantages of deep and rapid detection, the semi-airborne electromagnetic survey method is applied to the detection of complex terrain.

However, the maximum detection depth of the existing semi-airborne frequency-domain electromagnetic survey system is close to 1000 meters (m), but is far less than the 3-5 kilometers (km) that the ground artificial source electromagnetic system reaches. At the beginning of the 21st century, some scholars have carried out comparative research on the ground electromagnetic survey system, the semi-airborne electromagnetic survey system and the airborne electromagnetic survey system. The results show that the data quality and detection depth of the semi-airborne electromagnetic survey method are better than data quality and detection depth of the airborne electromagnetic survey method, but only second to data quality and detection depth of the ground electromagnetic survey method. In other words, the existing semi-airborne electromagnetic survey system has not fully exerted the advantages of deep detection of ground-based emission sources. The main reason is that the measured vertical magnetic field component signals of the semi-airborne electromagnetic survey system is weak and attenuates rapidly with the increase of transmitting-receiving distance, which leads to a low signal-to-noise ratio of the system. Therefore, improving the signal-to-noise ratio of the system is very important to improve the detection depth and accuracy of the system, and one of the key-off technologies is to reduce the noise level of the receiving system as much as possible.

The main noise source of the semi-airborne frequency-domain electromagnetic survey system is the motion noise introduced into the receiving coil during the mobile measurement of the receiving system, specifically:

1) the coil cuts the magnetic induction line of the geomagnetic field when moving in air, and the motion drift consistent with the motion frequency of the coil is introduced into the coil; and
2) the attitude change of the coil during the movement leads to the change of the equivalent receiving area of the coil in the direction of the measured magnetic field, and introduces magnetic fields with other components to cause attitude errors. Motion noise seriously reduces the signal-to-noise ratio of observation data, and is the main factor limiting the detection depth and the accuracy of the system.

Conventional receiving coil design has two types: uniaxial measurement and three-axis measurement.

The main advantage of uniaxial measurement is that the coil is simple in structure and light in weight, and is suitable to be mounted on the flight platform, and then the motion noise is suppressed by data post-processing. The uniaxial measurement is mainly aimed at the situation that the detection frequency in time domain or frequency domain is higher than the frequency band of the motion noise. For the frequency-domain system, when the detection frequency is the same as frequency of the motion drift and attitude error, the uniaxial measurement is of no help.

Although three-axis measurement may fuse multi-component information and suppress motion noise to a certain extent, device structure of the three-axis measurement is complex and the influencing factors of effective signals increase.

Single-component magnetic field measurement mainly considers in that, the coil is simple in structure and light in weight, and is suitable to be mounted on the flight platform, and then the motion noise is suppressed by data post-processing. However, the data post-processing process is mainly aimed at the situation that the detection frequency in time domain or frequency domain is higher than the frequency band of the motion noise. For the frequency-domain system, when the detection frequency is the same as the frequency of the motion drift and the attitude error, the data processing method is of no help.

Three-component magnetic field measurement with multi-component information may suppress the motion noise to a certain extent, and correct the attitude through "three-axis attitude measurement+iterative calculation of apparent resistivity". However, the structure of the measuring device is complex, and the attitude correction method is based on the assumption that the response magnetic field after attitude deflection changes monotonically with resistivity in one-dimensional geoelectric model, the attitude error correction effect of three-dimensional abnormal detection data is unclear, and the problem of magnetic field attitude error in semi-airborne system cannot be fundamentally solved.

In a word, the conventional coil structure measurement method or uniaxial measurement method has a simple structure and singular information, only deals with the noise of time domain system or specific source through post-processing, and cannot eliminate the same-frequency motion noise of frequency-domain system; although three-axis measurement may fuse three-component magnetic field information to suppress the motion drift, the three-axis measurement has complex structure and heavy weight. Neither uniaxial measurement nor three-axis measurement may fundamentally remove the motion noise, nor may simultaneously remove the motion drift and the attitude noise of the semi-airborne frequency-domain electromagnetic survey system and nor cancel the motion noise at one time.

SUMMARY

An objective of the application is to provide a semi-airborne electromagnetic survey device and a method based on coaxial coplanar mutual reference coil assembly, so as to measure additive motion noise in a semi-airborne electromagnetic survey system, decouple all the motion noise including same-frequency motion noise from real magnetic field response signals on the basis of uniaxial magnetic field measurement, simplify the survey system and survey method and improve the consistency between the measurement results and the real results.

To achieve the above objective, the present application adopts following technical schemes.

A semi-airborne electromagnetic survey device based on a coaxial coplanar mutual reference coil assembly includes the coil assembly, and the coil assembly includes a measuring coil and a reference coil with linear correlation of additive motion noise;

the reference coil and the measuring coil have a same bandwidth;

detection resolution of the reference coil only distinguishes the additive motion noise, but does not distinguish real vertical magnetic field signals;

the resolution of measuring coil may simultaneously distinguish the response vertical magnetic field signals and motion noise (including the additive motion noise and multiplicative motion noise);

an outer diameter of the reference coil is much smaller than an outer diameter of the measuring coil;

the reference coil and the measuring coil are coaxial and coplanar;

the measuring coil and the reference coil are in hard connection or soft connection, where the hard connection means that a connection structure between the measuring coil and the reference coil does not cause relative displacement between the measuring coil and the reference coil due to own deformation, and further change coaxial and coplanar characteristics of the measuring coil and the reference coil; the soft connection, namely elastic connection, means that the connection structure between the measuring coil and the reference coil causes the relative displacement between the measuring coil and the reference coil during movement of the coil assembly due to own deformation, and further changes the coaxial and coplanar characteristics of the measuring coil and the reference coil.

The linear correlation of the additive motion noise refers to correlation between signals collected by the measuring coil and signals collected by the reference coil, and the correlation coefficient is used as a factor to describe the correlation between the signals collected by the measuring coil and the signals collected by the reference coil. For example, in the application, only when the reference coil and the measuring coil are coaxial and coplanar and motion states are completely consistent, the linear correlation of the additive motion noise in the measuring coil and the reference coil is guaranteed.

The measuring coil and the reference coil are hollow coil sensors with arbitrary shapes. The measuring coil and the reference coil disclosed in the application are non-closed, similar to spiral type, with multiple taps.

Further, the semi-airborne electromagnetic survey device includes:

a ground-based emission source, where the ground-based emission source injects current into ground and excites the ground to generate a response magnetic field in air;

a receiver, where the receiver includes two acquisition channels for receiving magnetic field signals in the measuring coil and the reference coil respectively; and an airborne flight suspension platform, where the airborne flight suspension platform lifts the coil assembly and the receiver into the air, and the receiver moves together with the coil assembly.

In an embodiment, the reference coil and the measuring coil are in the soft connection, the semi-airborne electromagnetic survey device further includes an angle sensor, and the angle sensor records a three-axis angular deviation of the reference coil and the measuring coil.

In an embodiment, the airborne flight suspension platform is a helicopter or an unmanned aerial vehicle (UAV).

In an embodiment, the hard connection is a hard bracket, and the soft connection is a soft rope.

In an embodiment, the measuring coil and the reference coil are square or circular, and shapes are selected so as to easily determine centers of the measuring coil and the reference coil, so that the measuring coil and the reference coil are made into a coaxial and coplanar coil assembly. For example, a square coil is easier to measure the center position than a circular coil.

A semi-airborne electromagnetic survey method based on a coaxial coplanar mutual reference coil assembly includes a receiving coil moving in air, where the receiving coil receives response magnetic field signals from an underground anomalous body in the air; the semi-airborne electromagnetic survey method includes following steps: dividing the receiving coil into two coaxial and coplanar coils with consistent motion states during surveying, where one of the two coils only receives additive motion noise, and an other of the two coils simultaneously receives the additive motion noise and real vertical magnetic field signals; and then cancelling the additive motion noise received by the two coils to obtain the real vertical magnetic field signals, where the motion noise includes the additive motion noise and the multiplicative motion noise, but the multiplicative motion noise has little influence on the vertical magnetic field signals, so it is considered that the real vertical magnetic field signals are obtained after canceling the additive motion noise.

In an embodiment, the semi-airborne electromagnetic survey method further includes correcting a coaxiality of the two coils through the three-axis angle deviation between the two coils, where a method of the coaxiality correction belongs to the prior art and is therefore not described here.

The embodiments of the application have following effects.

Firstly, the application abandons the complicated device form of measuring the three-component magnetic field in the conventional measuring system, and uses a coil assembly consisting of a coaxial and coplanar small-diameter reference coil and a large-diameter measuring coil as a magnetic field sensor to measure the additive motion noise caused by the motion of the measuring coil in the system.

Secondly, as both the motion drift and the attitude error are much greater than the strength of the measured vertical magnetic field signals, the reference coil with the low sensitivity and the small outer diameter designed in the application may acquire the additive motion noise, decouples the same-frequency motion noise from the real response magnetic field signals, and finally completes one-time cancellation of the same-frequency motion noise of the semi-airborne frequency-domain electromagnetic survey system.

Thirdly, the coaxial and coplanar coil assembly has characteristics of simple structure and light weight, and is suitable for being mounted on a flight platform. The coaxial and coplanar coil assembly decouples all the motion noise (including the same-frequency motion noise) of the semi-airborne frequency-domain electromagnetic survey system and the real response magnetic field signals, completes the survey of the motion drift and the attitude error, and realizes the one-time cancellation of the additive motion noise of the semi-airborne frequency-domain electromagnetic survey system.

DETAILED DESCRIPTION OF THE EMBODIMENTS

Figure 1:
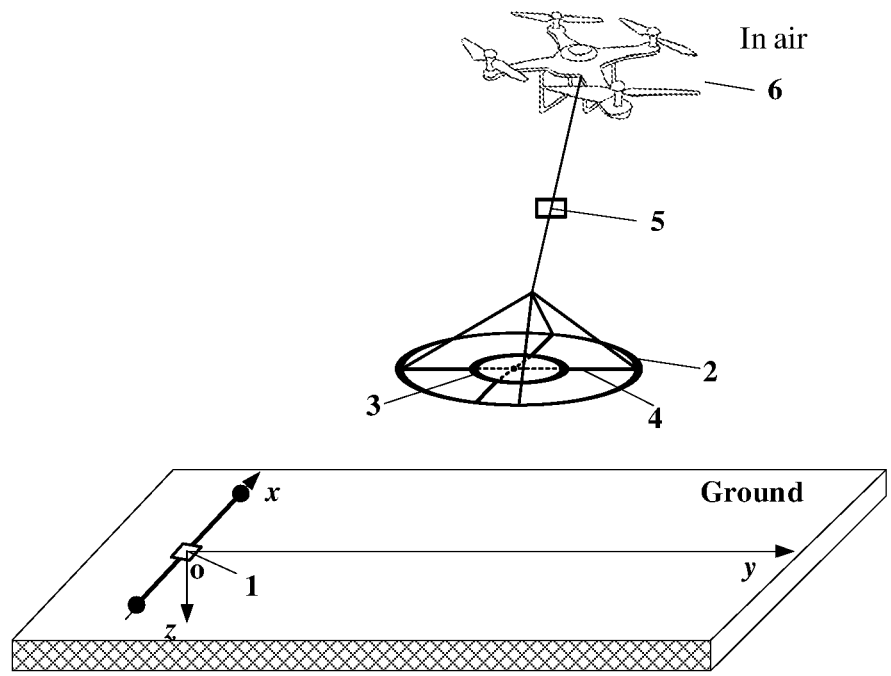
FIG. 1 is a schematic diagram of an additive motion noise survey device based on a coaxial reference coil.

Various exemplary embodiments of the present application are now described in detail, and this detailed description should not be considered as a limitation of the present application, but should be understood as a more detailed description of some aspects, characteristics and embodiments of the present application.

In semi-airborne electromagnetic survey, both motion drift and attitude error are much greater than strength of measured vertical magnetic field signals. Moreover, additive motion noise mainly includes the low-frequency motion drift and the attitude error caused by horizontal component introduced by the coil attitude deflection. Therefore, removal of the motion drift and the attitude error simultaneously is essentially the removal of the additive motion noise.

Based on the above reasons, a reference coil 3 with low sensitivity and a small outer diameter is designed in the application to make the resolution of the reference coil 3 may not identify vertical magnetic field signals but may distinguish the additive motion noise, then, the reference coil 3 with the small outer diameter is used to measure the additive motion noise and further decouple the additive motion noise from real response magnetic field signals, and finally the additive motion noise of the semi-airborne frequency-domain electromagnetic survey system is removed.

When the reference coil 3 with the small outer diameter and a measuring coil 2 with a large outer diameter are coaxial and coplanar and have consistent motion states, additive noise in the measuring coil 2 and additive noise in the reference coil 3 are consistent and only differ by one multiple, so that the additive motion noise is removed by simple linear operation.

When designing coils for semi-airborne electromagnetic survey, a coaxial and coplanar reference coil assembly is adopted, that is, the coil assembly formed by connecting and combining the measuring coil 2 and the reference coil 3, where the measuring coil 2 and the reference coil 3 satisfy following principles in index parameters of the sensitivity, noise and bandwidth:

principle 1: the reference coil 3 and the measuring coil 2 have a same bandwidth;

principle 2: the resolution of the reference coil 3 may only distinguish the additive motion noise, but may not distinguish the response vertical magnetic field signals; and principle 3: the resolution of measuring coil 2 may simultaneously distinguish the response vertical magnetic field signals and motion noise (including the additive motion noise and multiplicative motion noise).

According to the above principles 1-3, the application designs an additive motion noise survey system based on a coaxial coplanar mutual reference coil assembly as shown in FIG. 1, and the measuring coil 2 and the reference coil 3 are completely coaxial and coplanar in mechanical design, so as to keep the motion attitude of the measuring coil 2 and the motion attitude the reference coil 3 consistent. Due to the influence of machining, assembly precision and connection structure of coils, there may be three-axis angle deviation between coaxial and coplanar measuring coil 2 and reference coil 3. At this time, a high-precision angle sensor is used to record the three-axis angle deviation, and a coaxiality correction factor is introduced to make the measurement data of the measuring coil 2 and the reference coil 3 meet the requirements of complete coaxial and coplanar.

It should be pointed out that there are no restrictions on winding modes and structural parameters of the reference coil 3 and the measuring coil 2, but it is necessary to make the winding modes and the structural parameters of the reference coil 3 and the measuring coil 2 consistent as far as possible to avoid other influencing factors caused by different winding modes and structural parameters. The core of the application is to establish a linear relationship between transfer function of the reference coil 3 and transfer function of the measuring coil 2, so as to ensure that the sensitivity of the reference coil 3 is 1/N of the sensitivity of the measuring coil and N is large enough. Shapes of the reference coil 3 and the measuring coil 2 need to be consistent, for example, circular or square, so as to avoid the inconsistent motion states caused by different shapes and affect linear correlation of the additive motion noise.

As both the motion drift and the attitude error are much greater than the strength of the measured vertical magnetic field signals, the reference coil 3 with the low sensitivity and the small outer diameter designed in the application may acquire single motion noise (additive motion noise), decouples same-frequency motion noise from the real response magnetic field signals, and finally completes one-time cancellation of the same-frequency motion noise of the semi-airborne frequency-domain electromagnetic survey system.

The coaxial coplanar coil assembly consisting of the measuring coil 2 and the reference coil 3 has characteristics of simple structure and light weight, and is suitable for being mounted on a flight platform. The coaxial coplanar coil assembly decouples all the motion noise (including the same-frequency motion noise) of the semi-airborne frequency-domain electromagnetic survey system and the real response magnetic field signals, completes the removal of the motion drift and the attitude error, and realizes the one-time cancellation of the additive motion noise of the semi-airborne frequency-domain electromagnetic survey system.

Embodiment 1

As shown in FIG. 1, a semi-airborne electromagnetic survey device includes a ground-based emission source 1 for exciting the ground to generate a response magnetic field in air, and a UAV as an airborne flight suspension platform 6. The UAV is connected with a receiver and a coil assembly at the same time and lifts the receiver 5 and the coil assembly into the air. The coil assembly includes a measuring coil 2 with a larger outer diameter and a reference coil 3 with a smaller outer diameter, and the measuring coil 2 and the reference coil 3 are conventional circular hollow coil sensors, and are distributed coplanar and coaxial. The measuring coil 2 and the reference coil 3 are connected by a coil connecting device 4, the coil connecting device 4 is a rigid bracket (optionally, in order to ensure the coaxiality, an angle sensor is used in the embodiment to record the coaxiality difference between the measuring coil 2 and the reference coil 3 and further to correct the coaxiality, but if rigidity of the hard connection is good enough, the angle sensor is not needed). The measuring coil 2 and the reference coil 3 satisfy the aforementioned principle 1, principle 2 and principle 3.

In the semi-airborne electromagnetic survey device, the measuring coil 2 is used for receiving the real vertical magnetic field signals, the additive motion noise and the multiplicative motion noise from the response magnetic field in the air, while the reference coil 3 only receives the additive motion noise, and the receiver 5 including two acquisition channels obtains the signals received by the measuring coil 2 and the reference coil 3 respectively, and then cancels the additive noise signals received by the measuring coil 2 and the reference coil 3.

Embodiment 2

As shown in FIG. 1, a semi-airborne electromagnetic survey device includes a ground-based emission source 1 for exciting the ground to generate a response magnetic field in air, a UAV as an airborne flight suspension platform 6 and a high-precision angle sensor. The UAV is connected with a receiver 5 and a coil assembly at the same time and lifts the receiver 5 and the coil assembly into the air. The coil assembly includes a measuring coil 2 with a larger outer diameter and a reference coil 3 with a smaller outer diameter, and the measuring coil 2 and the reference coil 3 are conventional circular hollow coil sensors, and are distributed coplanar and coaxial. The measuring coil 2 and the reference coil 3 are connected by a coil connecting device 4, and the coil connecting device 4 is a soft rope. The measuring coil 2 and the reference coil 3 satisfy the aforementioned principle 1, principle 2 and principle 3.

In the semi-airborne electromagnetic survey device, different from the embodiment 1, the embodiment 2 adopts the soft rope as the coil connecting device 4 and also introduces the high-precision angle sensor, namely a method of "soft connection+coaxiality correction", aiming at the problem that the coaxiality between the measuring coil 2 and the reference coil 3 changes when the soft rope is used as the coil connecting device 4. The angle sensor is used to record the three-axis angle deviation between the measuring coil 2 and the reference coil 3, and then introduce the coaxiality correction factor, so as to ensure that the measurement data of the measuring coil 2 and the reference coil 3 meet the requirements of complete coaxial and coplanar. The method of the coaxiality correction belongs to the prior art and is not described here.

Figure 2:
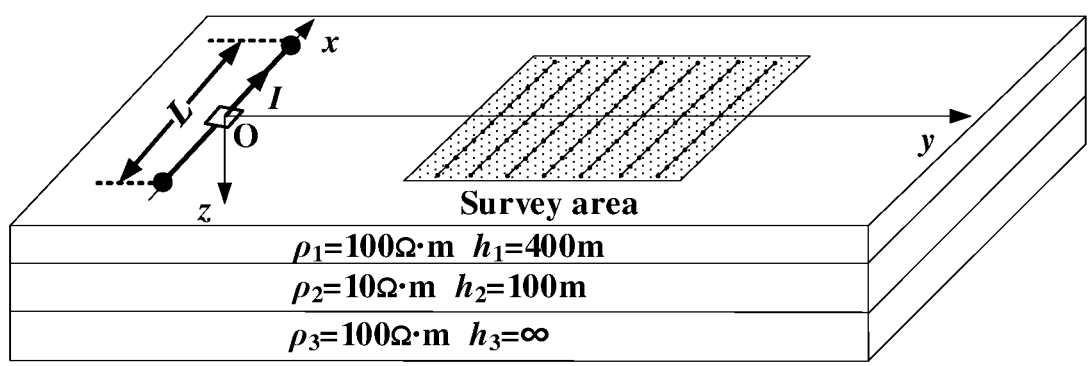
FIG. 2 is a simulation model diagram of a three-layer geoelectric structure.
Figure 3A:
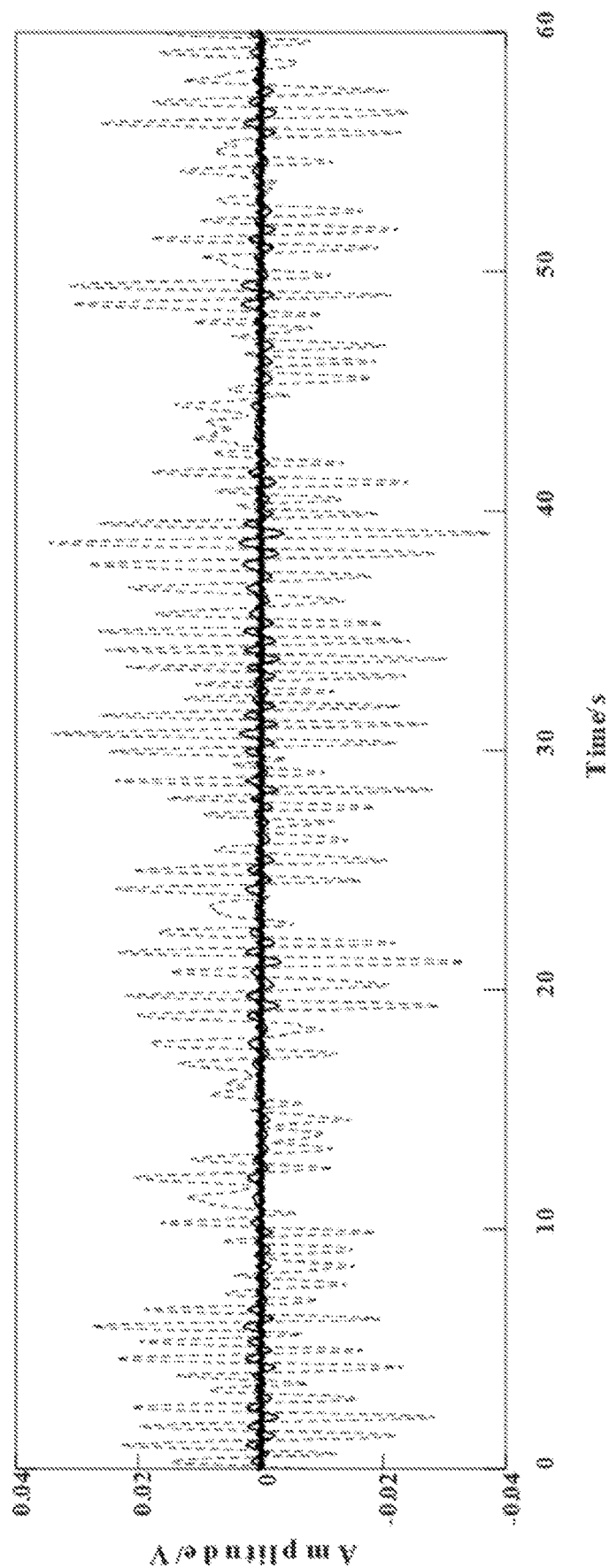
FIG. 3a shows time series of induced voltage measured by a measuring coil and a reference coil.
Figure 3B:
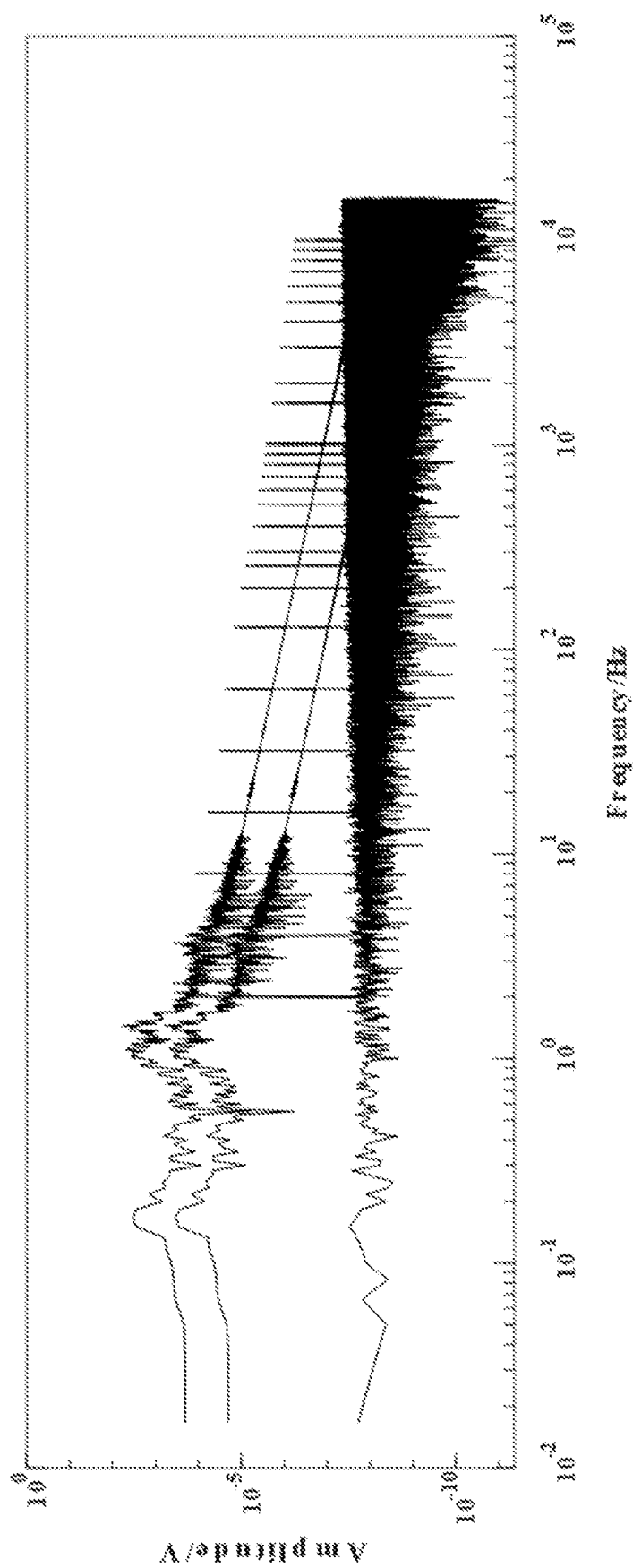
FIG. 3b shows frequency spectra of induced voltage measured by a measuring coil and a reference coil.

As shown in FIG. 2, in order to verify the semi-airborne electromagnetic survey device and method of the application, a three-layer geoelectric model in the FIG. 2 is constructed, and ideal response vertical magnetic induction intensity Bz and apparent resistivity Rho of a measuring point (100, 4000, −20) in space are calculated by a one-dimensional forward modeling without considering the motion noise. Considering the additive motion noise caused by coil motion, noisy vertical magnetic induction intensity Bzm and noisy apparent resistivity Rhom obtained by the measuring coil 2 are simulated and calculated by using the measured low-frequency motion noise and the fixed three-axis attitude angle deviation (5°, 5° and 20°). According to the semi-airborne electromagnetic survey device and method of the application, additive motion noise Bzr of the semi-airborne frequency-domain electromagnetic survey system is measured by the reference coil 3, the additive motion noise is subtracted from results of the measuring coil 2, and vertical magnetic induction intensity Bza and apparent resistivity Rhoa after denoising are calculated. The time series and frequency spectra of induced voltage in the measuring coil 2 and the reference coil 3 are shown in FIG. 3a and FIG. 3b. In the FIG. 3a, a dotted line represents data of the measuring coil 2, a thin line represents data of the reference coil 3, a thick line represents data after denoising; in the FIG. 3b, a top curve represents a spectrum of the measuring coil 2, a middle curve represents a spectrum of the reference coil 3, and a bottom curve represents a spectrum after denoising.

Figure 4A:
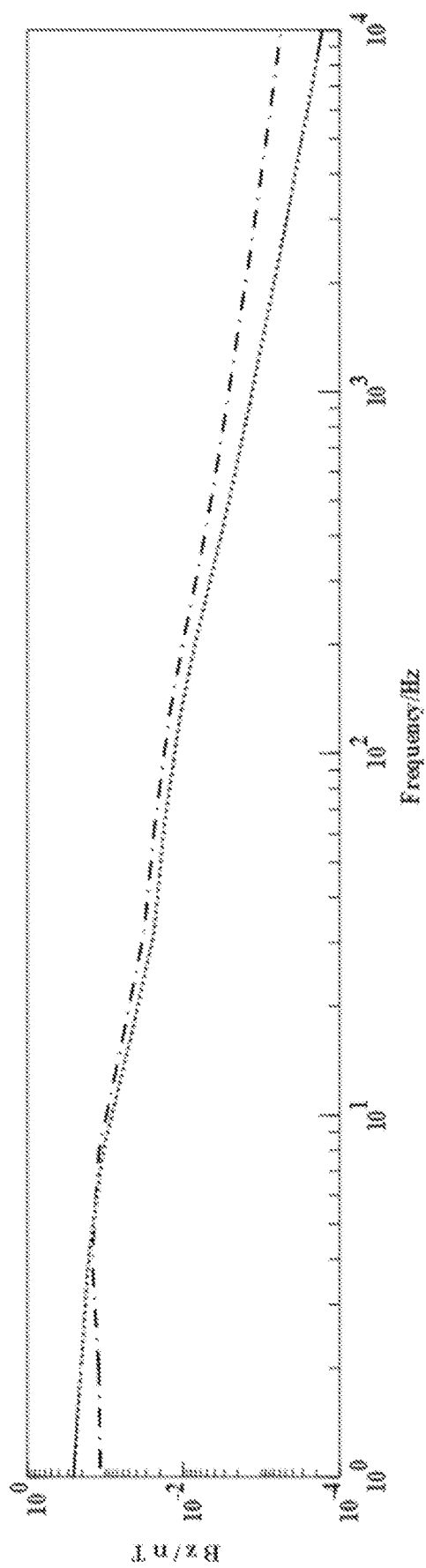
FIG. 4a shows an ideal vertical magnetic induction intensity curve and vertical magnetic induction intensity curves before and after denoising.
Figure 4B:
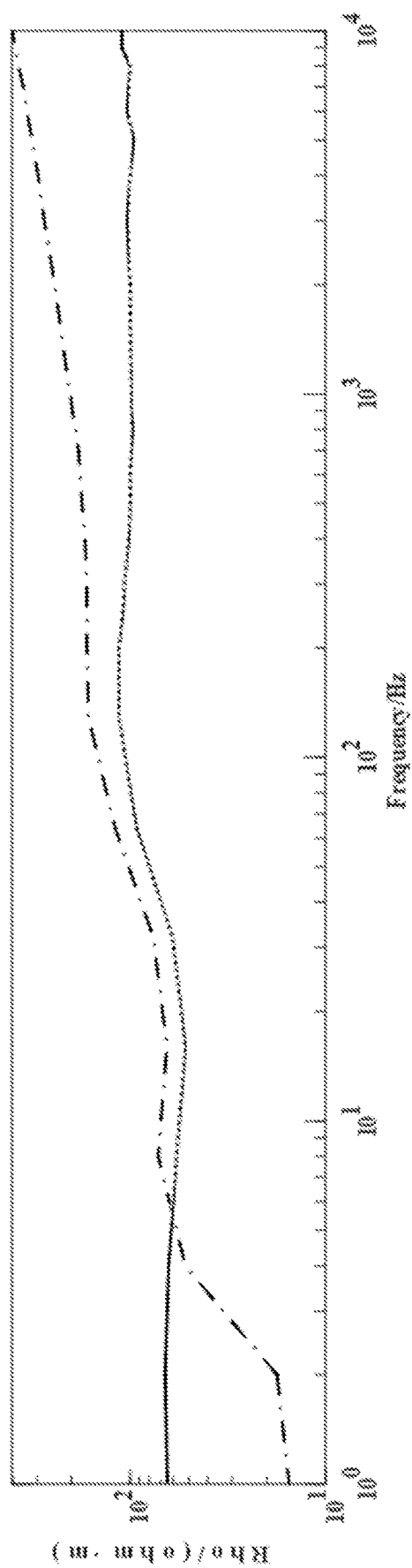
FIG. 4b shows an ideal apparent resistivity curve and apparent resistivity curves before and after denoising.
Figure 4C:
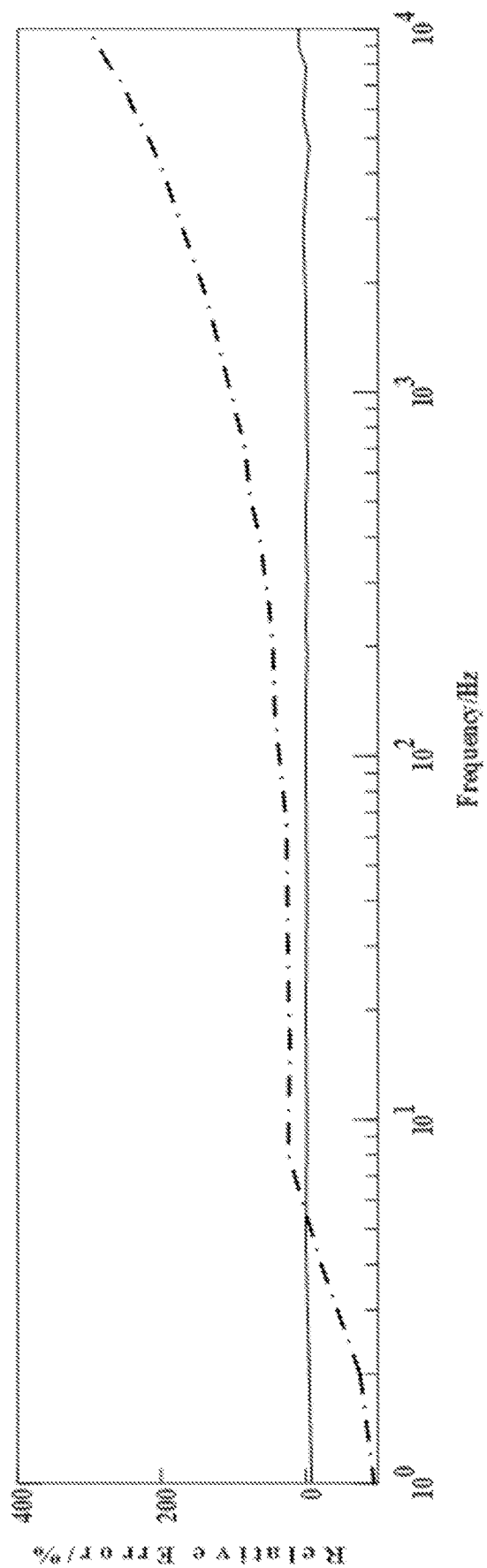
FIG. 4c shows relative error curves between apparent resistivities before and after denoising and ideal apparent resistivity.

As shown in FIG. 4a, an ideal vertical magnetic induction intensity curve is compared with vertical magnetic induction intensity curves before and after denoising, where a solid line represents the ideal vertical magnetic induction intensity curve, a dash-dotted line represents the vertical magnetic induction intensity curve before denoising and a dotted line represents the vertical magnetic induction intensity curve after denoising. As shown in FIG. 4b, an ideal apparent resistivity curve is compared with apparent resistivity curves before and after denoising, where a solid line represents the ideal apparent resistivity curve, a dash-dotted line represents the apparent resistivity curve before denoising and a dotted line represents the apparent resistivity after denoising. As shown in FIG. 4c, relative error curves between the apparent resistivities before and after denoising and ideal apparent resistivity are shown, where a solid line represents a relative error curve between apparent resistivity after denoising and the ideal apparent resistivity and a dash-dotted line represents a relative error curve between the apparent resistivity before denoising and the ideal apparent resistivity.

It can be seen from FIG. 4a, FIG. 4b and FIG. 4c that an ideal apparent resistivity amplitude of the three-layer geoelectric model is in a range of (50, 100) without considering the motion noise of the receiving coil, and the ideal apparent resistivity curve shows a changing trend of the three-layer structure, which conforms to the basic law of semi-airborne electromagnetic survey. After introducing the additive motion noise, a measured vertical magnetic induction intensity curve in the measuring coil 2 obviously deviates from the ideal vertical magnetic induction intensity curve at some frequencies. The amplitude of the apparent resistivity is in the range of (10,400), the relative error is higher than 300%, and an apparent resistivity curve shows an upward trend in low frequency band, which does not conform to the distribution law of the three-layer geoelectric model. By using the survey device and method designed in the application, the vertical magnetic induction intensity is closer to the ideal value after removing the additive motion noise, the apparent resistivity amplitude curve is also close to the ideal curve, and the relative error is less than 5%, and within a tolerance range, and the trend of curve is consistent with the ideal curve, reflect the changing trend of three-layer structure.

The basic principle, main features and advantages of the present application have been shown and described above. It should be understood by those skilled in the art that the present application is not limited by the above-mentioned embodiments, and what is described in the above-mentioned embodiments and descriptions only illustrates the principles of the present application. Without departing from the spirit and scope of the present application, there will be various changes and improvements in the present application, which fall within the scope of the claimed application. The scope of the present application is defined by the appended claims and their equivalents.

What is claimed is:

1. A semi-airborne electromagnetic survey device based on a coaxial coplanar mutual reference coil assembly, comprising the coil assembly, wherein the coil assembly comprises a measuring coil and a reference coil with linear correlation of additive motion noise, wherein
   the reference coil and the measuring coil have a same bandwidth;
   detection resolution of the reference coil is only capable of distinguishing the additive motion noise, and is not capable of distinguishing real vertical magnetic field signals;
   detection resolution of the measuring coil is capable of distinguishing the real vertical magnetic field signals and motion noise simultaneously;
   an outer diameter of the reference coil is much smaller than an outer diameter of the measuring coil;
   the reference coil and the measuring coil are coaxial and coplanar; and
   the measuring coil and the reference coil are in hard connection or soft connection.

2. The semi-airborne electromagnetic survey device based on the coaxial coplanar mutual reference coil assembly according to claim 1, further comprising:
   a ground-based emission source, wherein the ground-based emission source injects current into ground and excites the ground to generate a response magnetic field in air;
   a receiver, wherein the receiver comprises two acquisition channels for receiving magnetic field signals in the measuring coil and the reference coil respectively; and
   an airborne flight suspension platform, wherein the airborne flight suspension platform lifts the coil assembly and the receiver into the air.

3. The semi-airborne electromagnetic survey device based on the coaxial coplanar mutual reference coil assembly according to claim 1, wherein the reference coil and the measuring coil are in the soft connection, the semi-airborne electromagnetic survey device further comprises an angle sensor, and the angle sensor records three-axis angular deviation of the reference coil and the measuring coil.

4. The semi-airborne electromagnetic survey device based on the coaxial coplanar mutual reference coil assembly according to claim 2, wherein the airborne flight suspension platform is a helicopter or an unmanned aerial vehicle.

5. The semi-airborne electromagnetic survey device based on the coaxial coplanar mutual reference coil assembly according to claim 1, wherein the hard connection is a hard bracket, and the soft connection is a soft rope.

6. The semi-airborne electromagnetic survey device based on the coaxial coplanar mutual reference coil assembly according to claim 1, wherein the measuring coil and the reference coil are square or circular.

7. A semi-airborne electromagnetic survey method based on a coaxial coplanar mutual reference coil assembly, comprising a receiving coil moving in air, wherein the receiving coil receives response magnetic field signals from an underground anomalous body in the air;
   wherein the receiving coil is divided into two coaxial and coplanar coils with consistent motion states, one of the coils only receives additive motion noise, an other of the coils simultaneously receives the additive motion noise and real vertical magnetic field signals, and then the additive motion noise received by the two coils is cancelled to obtain the real vertical magnetic field signals.

8. The semi-airborne electromagnetic survey method based on the coaxial coplanar mutual reference coil assembly according to claim 7, further comprising correcting a coaxiality of the two coils.

* * * * *